United States Patent
Hutto

(10) Patent No.: US 9,463,664 B2
(45) Date of Patent: Oct. 11, 2016

(54) SPLIT AXLE CYCLE WHEEL

(71) Applicant: Arne Todd Hutto, Edgewater, FL (US)

(72) Inventor: Arne Todd Hutto, Edgewater, FL (US)

( * ) Notice: Subject to any disclaimer, the term of this patent is extended or adjusted under 35 U.S.C. 154(b) by 393 days.

(21) Appl. No.: 14/098,251

(22) Filed: Dec. 5, 2013

(65) Prior Publication Data

US 2014/0152077 A1    Jun. 5, 2014

Related U.S. Application Data

(60) Provisional application No. 61/733,690, filed on Dec. 5, 2012.

(51) Int. Cl.
*B60B 1/14* (2006.01)
*B60B 35/00* (2006.01)
*B60B 37/04* (2006.01)

(52) U.S. Cl.
CPC ............ *B60B 1/14* (2013.01); *B60B 35/004* (2013.01); *B60B 37/04* (2013.01); *B60Y 2200/12* (2013.01)

(58) Field of Classification Search
CPC ......... B60B 3/08; B60B 3/085; B60B 37/00; B60B 37/10; B60B 1/14; B60B 35/004; B60B 35/025
See application file for complete search history.

(56) References Cited

U.S. PATENT DOCUMENTS

| | | | | |
|---|---|---|---|---|
| 3,895,667 A * | 7/1975 | Mitchell | ............... | B21D 53/30 152/378 R |
| 4,463,824 A * | 8/1984 | Boyesen | ............... | B62K 25/26 180/227 |
| 5,248,019 A * | 9/1993 | Sbarro | ................... | B60B 3/048 180/219 |
| 5,732,798 A * | 3/1998 | Toson | ...................... | B62L 1/00 180/219 |
| 7,475,950 B1 * | 1/2009 | Glenn | ..................... | B60B 3/085 188/17 |
| 7,784,876 B2 * | 8/2010 | Perry | ..................... | B60B 27/02 188/218 XL |
| 2005/0016800 A1 * | 1/2005 | Kasten | ................... | F16D 65/12 188/218 XL |
| 2005/0168055 A1 * | 8/2005 | Conte | ...................... | B60B 1/06 301/64.201 |
| 2015/0273934 A1 * | 10/2015 | Huidekoper | ............. | B60B 5/02 301/11.1 |

* cited by examiner

*Primary Examiner* — Kip T Kotter
(74) *Attorney, Agent, or Firm* — Dunlap Bennett & Ludwig PLLC

(57) ABSTRACT

A split axle wheel system for a cycle, such as a motorcycle, is provided. The split axle wheel system may include a wheel having a first side and a second side. The first side and the second side may each include a rim. A spoke array and a drive ring gear may be attached to the rim. A chain may be wrapped around the driving ring gear, which is connected to a motor to rotate the wheel. The spoke array may include an opening with a bearing inside of the opening. A split axle bracket may run through the bearing and through the drive ring gear and may attach to the swing arm assembly of the motorcycle.

5 Claims, 4 Drawing Sheets

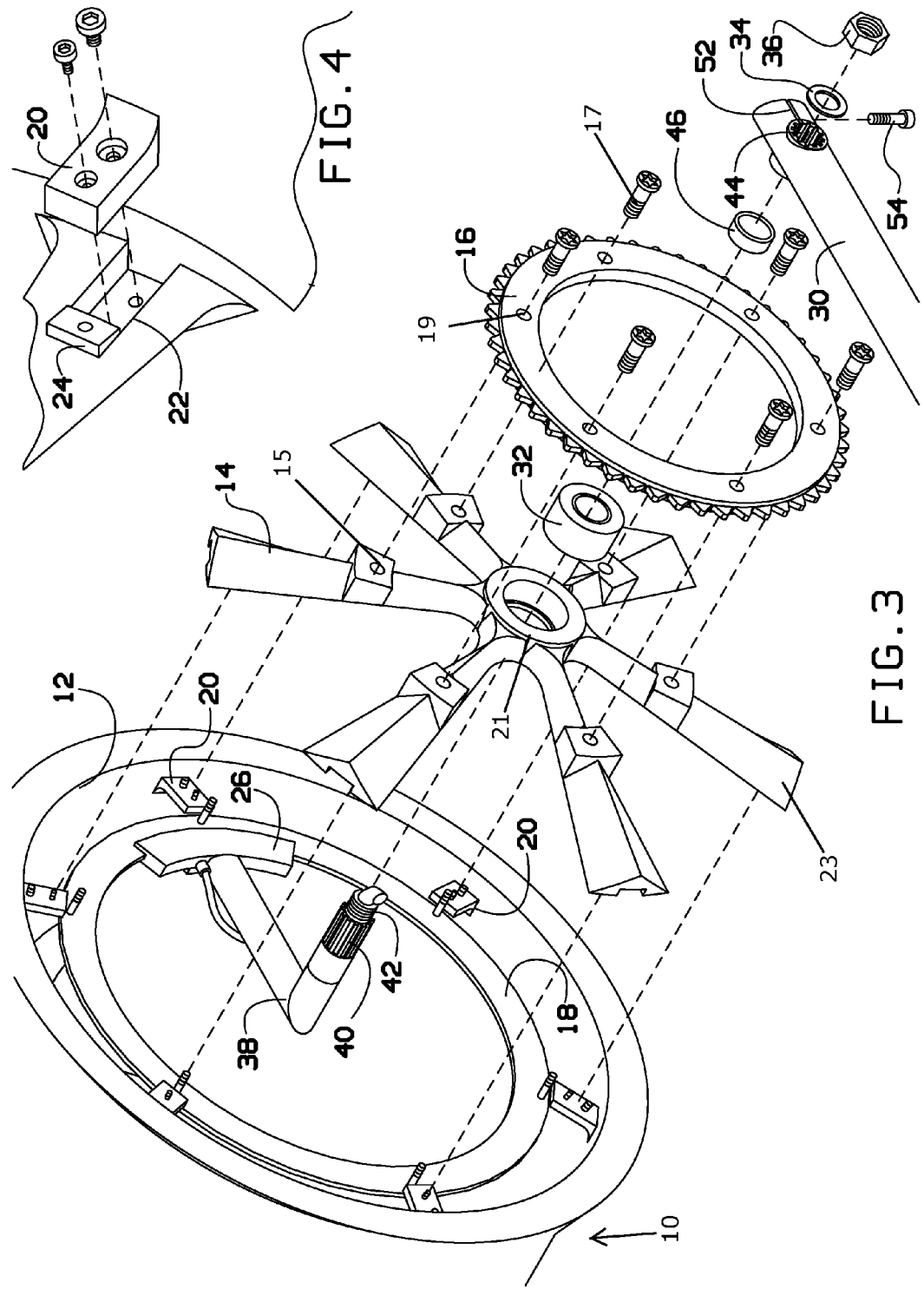

SPLIT AXLE CYCLE WHEEL

CROSS-REFERENCE TO RELATED APPLICATION

This application claims the benefit of priority of U.S. provisional application No. 61/733,690, filed Dec. 5, 2012, the contents of which are herein incorporated by reference.

BACKGROUND OF THE INVENTION

The present invention relates to a split axle cycle wheel and, more particularly, to a split axle cycle wheel for motorcycles.

A motorcycle (also called a motorbike, bike, or cycle) is a two or three wheeled motor vehicle. Motorcycles considerably vary with their intended task; e.g., long distance travel, navigating congested urban traffic, cruising, sport and racing, or off-road conditions. Motorcycles are one of the most affordable forms of motorized transport and, for most of the world's population, they are the most common type of motor vehicle Currently motorcycles include wheels mounted to swing-arms by a single axle. The spokes within the wheels are fixed. Certain motorcycle riders enjoy customizing the design of their motorcycle. Since the spokes of the wheels are fixed, a user would have to acquire a whole new set of wheels to change the look of the wheels.

As can be seen, there is a need for a wheel of a motorcycle that facilitates interchangeability.

SUMMARY OF THE INVENTION

In one aspect of the present invention, a split axle cycle wheel assembly comprises: a wheel comprising a first side and a second side, wherein the first side and second side each comprise: a rim; a spoke array mounted to the rim, wherein the spoke array comprises a center portion forming an opening; and a bearing within the opening of the spoke array; a drive ring gear mounted to at least one of the first side and second side of the wheel; a pair of split axle brackets each comprising a first end and a second end, wherein each split axle bracket runs through the bearing of the first side and the second side of the wheel; and a swing arm assembly configured to attach the wheel to a cycle, wherein the swing arm assembly comprises a first arm and a second arm each attached to the second ends of the pair of split axle brackets.

In another aspect of the present invention, a split axle cycle wheel assembly comprises: a wheel comprising a first side and a second side, wherein the first side and the second side each comprise: a rim comprising an outer portion and an inner portion; a brake rotor; a brake caliper; a spoke array mounted to the rim and the brake rotor, wherein the spoke array comprises a center portion forming an opening; and a bearing within the opening of the spoke array; a drive ring gear mounted to at least one of the spoke arrays on the first side and the second side of the wheel; and a first split axle bracket and a second split axle bracket each comprising a first end and a second end, wherein each of the first ends is attached to the brake caliper on the first side and the second side of the wheel and each of the second ends runs through the bearing on the first side and the second side of the wheel.

These and other features, aspects and advantages of the present invention will become better understood with reference to the following drawings, description and claims.

BRIEF DESCRIPTION OF THE DRAWINGS

FIG. 3 is an exploded detail view of the present invention omitting multiple components for illustrative clarity;
FIG. 4 is a detail exploded view of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a split axle wheel system for a cycle, such as a motorcycle. The split axle wheel system may include a wheel having a first side and a second side. The first side and the second side may each include a rim. A spoke array and a drive ring gear may be attached to the rim. A chain may be wrapped around the driving ring gear, which is connected to a motor to rotate the wheel. The spoke array may include an opening with a bearing inside of the opening. A split axle bracket may run through the bearing and through the drive ring gear and may attach to a swing arm assembly of the motorcycle.

In certain embodiments, the split axle configuration may further include a dual disc brake cycle wheel assembly. The rim of the present invention may be used as the hub of the wheel. The present invention may utilize a convex spoke design with a dual internal inverted caliper system, and a dual internal perimeter rotor system. The rims and the spokes of the present invention are interchangeable and thereby easier to customize than the standard wheel.

Figure 1:
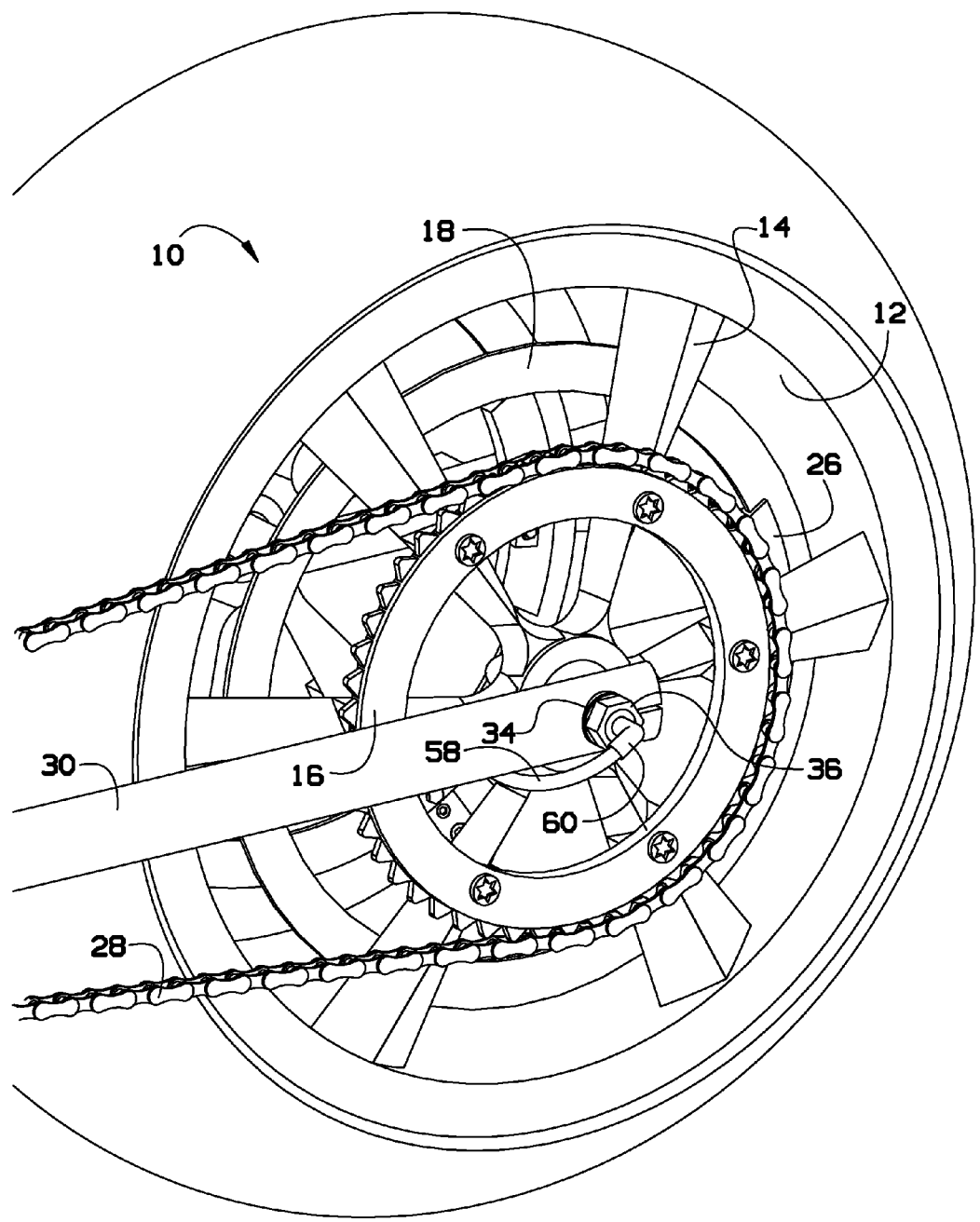
FIG. 1 is a perspective view of the present invention.
Figure 2:
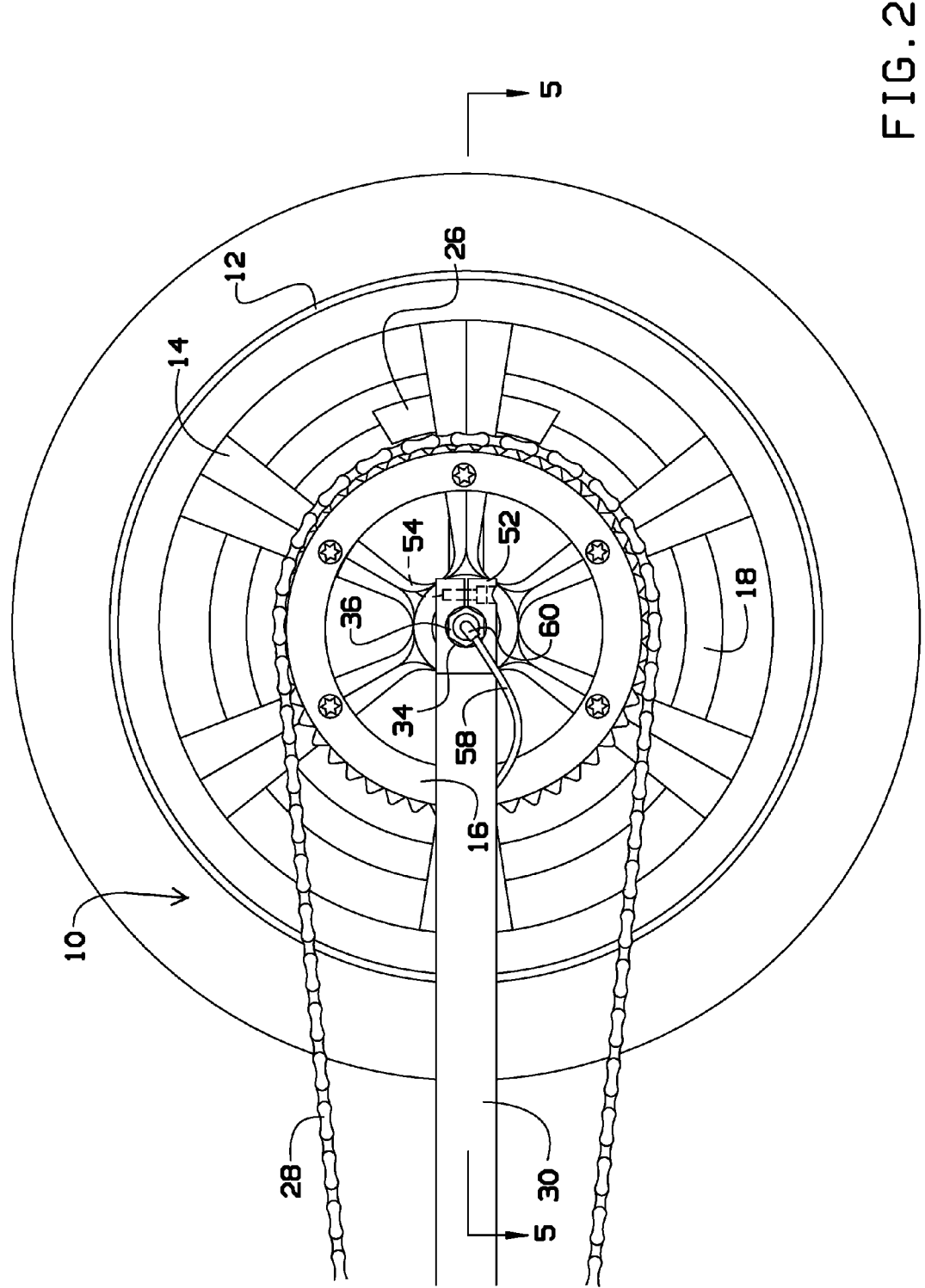
FIG. 2 is a side view of the present invention.
Figure 5:
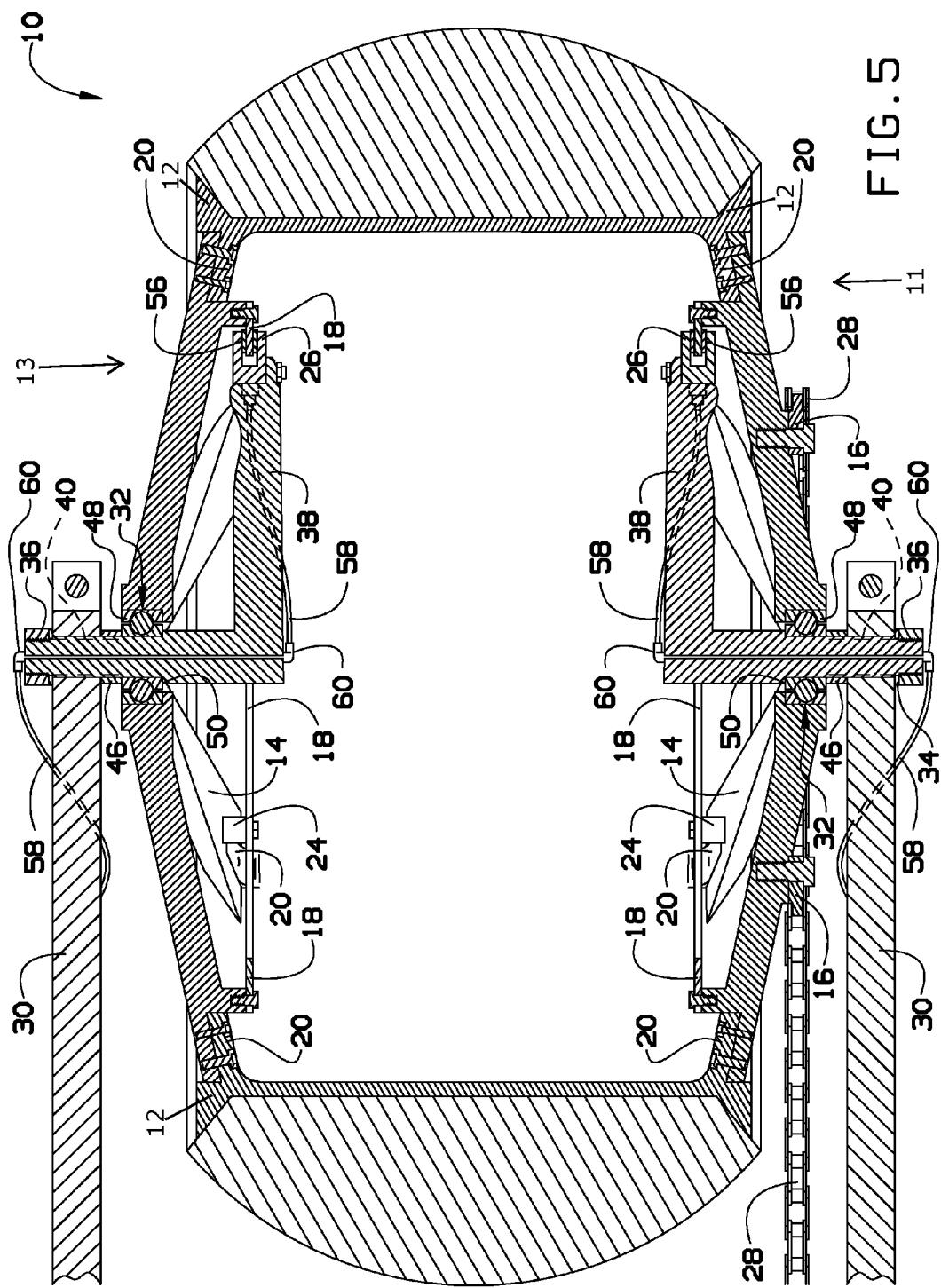
FIG. 5 is a section detail view of the present invention along 5-5 of FIG. 2.

Referring to FIGS. 1 through 5, the present invention may include a split axle wheel assembly. The split axle wheel assembly includes a wheel 10. The wheel 10 may include a first side 11 and a second side 13. A outer rim 12 may be along both the first side 11 and the second side 13 of the wheel 10. A spoke array 14 may be mounted to the rim 12 on the first side 11 and the second side 13 of the wheel 10. The spoke array 14 may include a center portion 21 forming an opening. The present invention may further include a drive ring gear 16 mounted to the spoke array 14 on at least one of the first side and the second side of the wheel 10. A chain 28 may rap around the driving ring gear 16 and connect with a transmission of the motorcycle. A bearing 32 with an outer race 48 and an inner race 50 may be within the opening of both of the spoke arrays 14.

The present invention may further include a first split axle bracket 38 and a second split axle bracket 38. The split axle brackets 38 may include a first end and a second end. The split axle brackets 38 may run through the bearing 32 and the driving gear 16 of the first side and the second side of the wheel 10. In certain embodiments, the present invention may include a brake system. The brake system may include a brake rotor 18 which is connected with the spoke array 14. A brake caliper 26 with a brake pad 56 may operatively connect with the brake rotor 18. The brake caliper 26 may be an inverted brake caliper and the brake rotor 18 may be perimeter brake rotor 18. In such embodiments, the first end of the split axle bracket 38 may be attached to the brake caliper 26. A brake line 58 may run from the brake caliper 26 to the brake master cylinder of the cycle. In certain embodiments, a fitting 60 may be attached to each end of the split axle bracket 38. The fitting 60 on the first end may direct the brake line 58 to a channel through the split axle bracket 38 and a fitting 60 on the second end may direct the channel back to the brake line 58.

The wheel assembly of the present invention may be attached to the cycle by a swing arm assembly having a first arm 30 and a second arm 30. Each arm 30 may attach to the second end of the split axle bracket 38 protruding from the first side and the second side of the wheel 10. In certain embodiments, the second end of the split axle bracket 38 may include a splined shoulder 40 and a threaded end 42. The arms 30 of the swing arm assembly may include a splined opening 44 that receives the splined shoulders 40 of the split axle bracket 38. The splined shoulder 40 fits through the splined opening 44, restricting rotation of the splined shoulder 40 relative to the swing arm assembly. A threaded nut 36 may screw to the threaded end 42 of the split axle bracket 38 once the splined shoulder 40 is within the splined opening 44, thereby securing the split axle bracket 38 to the arms 30 of the swing arm assembly. A washer 34 may be sandwiched in between the nut 36 and the arms 30 of the swing arm assembly. The washer 34 and nuts 36 may set the wheels 10 to the correct end play when torqued. In certain embodiments, the swing arm assembly may include split ends 52. A bolt 54 may be driven into the split ends 52, thereby securing the split ends 52 together. A spacer 46 may be used to space apart the bearing 32 from the swing arm assembly.

The spoke array 14 may be attached to the rim 12 by using any attachment components that may secure the spoke array 14 to the rim 12. For example, in certain embodiments the spoke array 14 may include a center portion, an outer portion, an inside surface, and an outside surface. The inside surface of the outer portion may include a plurality of slots 22 and rotor mounts 24. The outer rim 12 of the present invention may include a plurality of cleats 20 that align with the slots 22. The spoke array 14 may be removably attachable to the rim 12 by fitting the plurality of cleats 20 within the plurality of slots 22 and using a plurality of screws to screw the spoke array 14 to the rim 12. Further, in certain embodiments, the rotor mounts 24 may attach the spoke array 14 to the brake rotor 18.

The drive ring gear 16 may be attached to the spoke array 14 by using any attachment components that may secure the driving ring gear 16 to the spoke array 14. For example, in certain embodiments the spoke array 14 may include a plurality of arms extending from the center portion. The plurality of arms may include threaded openings 15 through the surface of the spoke array 14. The drive ring gear 16 may be attached to the spoke array 14 by screws 17 running through openings 19 in the drive ring gear 16 and screwing into the threaded opening 15 on the arms of the spoke array 14, thereby securing the drive ring gear 16 to the spoke array 14.

As illustrated in the Figures, the present invention facilitates interchangeable spoke arrays 14. A user may take the wheels 10 of the present invention apart and replace the spoke arrays 14 and attach the components of the present invention back together, thereby changing the style of the user's motorcycle.

It should be understood, of course, that the foregoing relates to exemplary embodiments of the invention and that modifications may be made without departing from the spirit and scope of the invention as set forth in the following claims.

What is claimed is:

1. A split axle cycle wheel assembly comprising:
a wheel comprising a first side and a second side, wherein each of the first side and the second side comprises: an outer rim; a spoke array removably attached to the outer rim, wherein the spoke array comprises an opening formed through a center portion; and a bearing disposed within the opening of the spoke array;
a first axle bracket comprising a first end and a second end, wherein the first axle bracket runs through the bearing of the first side, wherein the second end of the first axle bracket is configured to secure to a swing arm assembly of a motorcycle;
a second axle bracket comprising a first end and a second end, wherein the second axle bracket runs through the bearing of the spoke array of the second side, wherein the second end of the second axle bracket is configured to secure to the swing arm assembly of the motorcycle; and
a brake system disposed on at least one of the first side and the second side of the wheel, wherein the brake system comprises a brake rotor attached to an inner surface of the spoke array, and a brake caliper comprising a brake pad operatively connected to the brake rotor, wherein one of the first ends of the first axle bracket and the second axle bracket is attached to and extends from the brake caliper.

2. The split axle cycle wheel assembly of claim 1, wherein the first side and the second side each comprise the brake system.

3. The split axle cycle wheel assembly of claim 1, wherein the second end of each of the first axle bracket and the second axle bracket comprises a splined shoulder and a threaded end.

4. The split axle cycle wheel assembly of claim 1, wherein the spoke array comprises the center portion and an outer portion, wherein the outer portion comprises a plurality slots, wherein the outer rim comprises a plurality of cleats that align with the slots and wherein the spoke array is removably attachable to the rim by fitting the plurality of cleats within the plurality of slots and using a plurality of screws to screw the spoke array to the outer rim.

5. The split axle cycle wheel assembly of claim 1, further comprising a drive ring gear comprising a plurality of openings aligned with a plurality of threaded openings formed through the spoke array, wherein the drive ring gear is attached to an outer surface of the spoke array by screws running through the openings in the drive ring gear and screwing into the threaded openings of the spoke array.

\* \* \* \* \*